United States Patent
Bergo et al.

(10) Patent No.: US 6,944,824 B2
(45) Date of Patent: Sep. 13, 2005

(54) METHOD AND UNIT FOR CHANGING THE CONFIGURATION OF AN AUTOMATIC MACHINE

(75) Inventors: Daniele Bergo, Bologna (IT); Stefano Pareschi, S. Giorgio di Piano (IT); Mario Spatafora, Bologna (IT)

(73) Assignee: G.D Societa' per Azioni, Bologna (IT)

( * ) Notice: Subject to any disclaimer, the term of this patent is extended or adjusted under 35 U.S.C. 154(b) by 570 days.

(21) Appl. No.: 10/052,478

(22) Filed: Jan. 18, 2002

(65) Prior Publication Data

US 2002/0118228 A1 Aug. 29, 2002

(30) Foreign Application Priority Data

Jan. 23, 2001 (IT) .................................... BO2001A0030

(51) Int. Cl.[7] ............................. G06F 3/00; G06F 19/00
(52) U.S. Cl. ...................... 715/709; 715/771; 715/781; 715/810; 715/965; 715/970; 345/619
(58) Field of Search .............................. 715/700, 705, 715/709, 716, 719, 744, 747, 764, 765, 771, 773, 781, 810, 835, 838, 839, 846, 964, 965, 970; 345/619, 650, 765, 708, 705, 709, 735

(56) References Cited

U.S. PATENT DOCUMENTS

| 5,550,744 | A |  | 8/1996 | Steinbichler ........... 364/476.01 |
|---|---|---|---|---|
| 5,586,039 | A |  | 12/1996 | Hirsch et al. .......... 364/468.01 |
| 5,761,069 | A |  | 6/1998 | Weber et al. .......... 364/478.01 |
| 5,790,406 | A |  | 8/1998 | Dunn et al. ............ 364/474.11 |
| 5,825,356 | A | * | 10/1998 | Habib et al. ................. 345/712 |
| 5,877,961 | A | * | 3/1999 | Moore ......................... 700/180 |
| 5,910,090 | A | * | 6/1999 | Taute ........................... 53/504 |
| 5,997,167 | A |  | 12/1999 | Crater et al. ................. 364/184 |
| 6,100,857 | A |  | 8/2000 | Tani et al. ...................... 345/1 |
| 6,193,051 | B1 | * | 2/2001 | Focke ..................... 198/347.3 |
| 6,340,977 | B1 | * | 1/2002 | Lui et al. .................... 715/709 |
| 6,349,237 | B1 | * | 2/2002 | Koren et al. ................. 700/96 |
| 6,615,091 | B1 | * | 9/2003 | Birchenough et al. ........ 700/96 |
| 6,850,806 | B2 | * | 2/2005 | Yutkowitz .................... 700/54 |
| 2001/0039804 | A1 | * | 11/2001 | Newman et al. ............... 62/66 |

FOREIGN PATENT DOCUMENTS

EP    0741346    11/1996

* cited by examiner

Primary Examiner—X. L. Bautista
(74) Attorney, Agent, or Firm—Ladas & Parry

(57) ABSTRACT

A method and unit for changing the configuration of an automatic machine, whereby a user selects a desired end configuration by means of a selection device, and a display device then displays an orderly list of all and only the operations to be performed on the machine to convert the machine from a current start configuration to the desired end configuration; the list is arranged according to the sequence in which the operations are performed, and for each operation are displayed the state of at least one respective operating value in the start configuration, and the state of the same operating value in the end configuration.

14 Claims, 2 Drawing Sheets

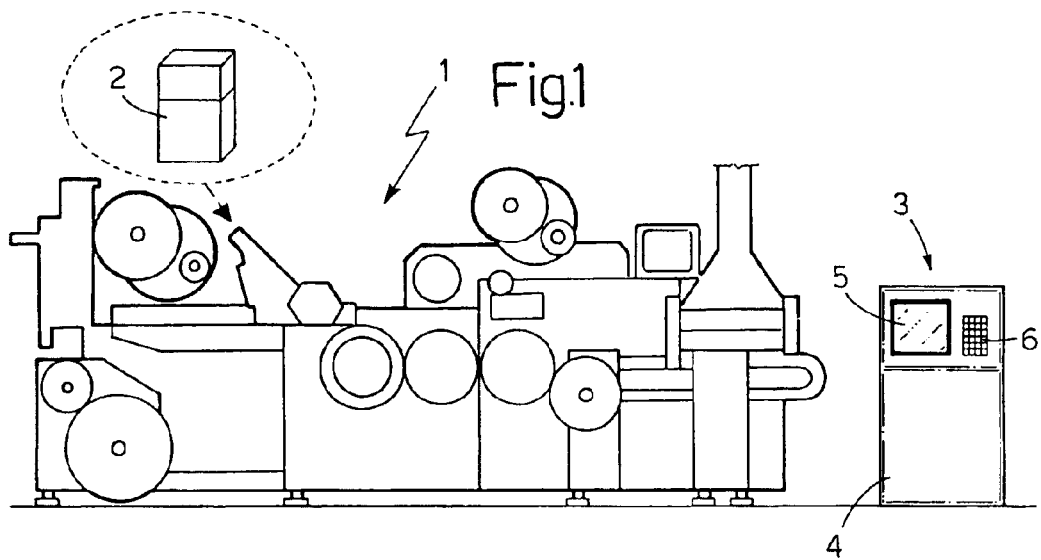
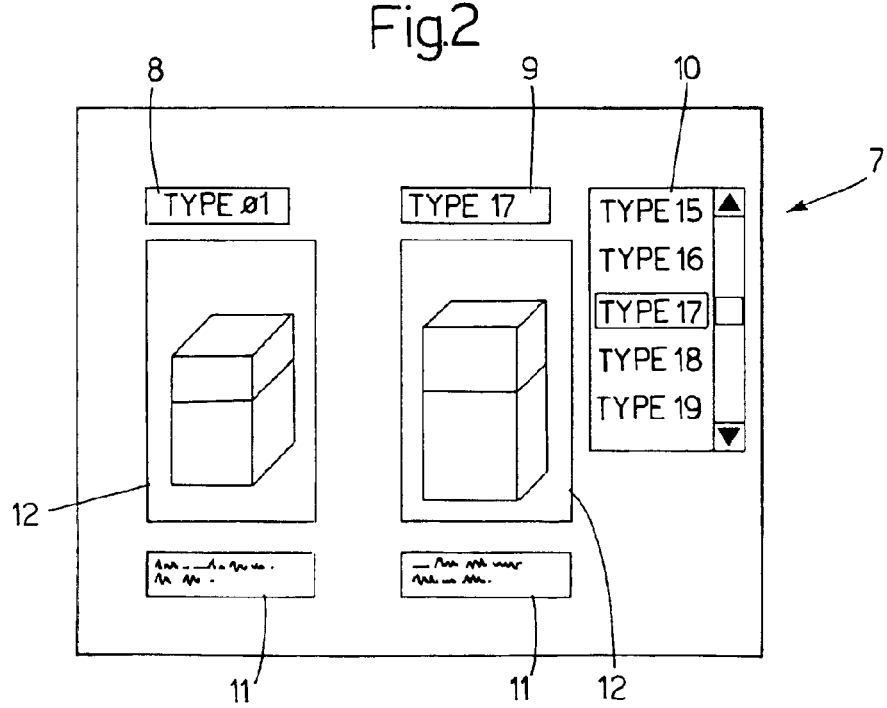

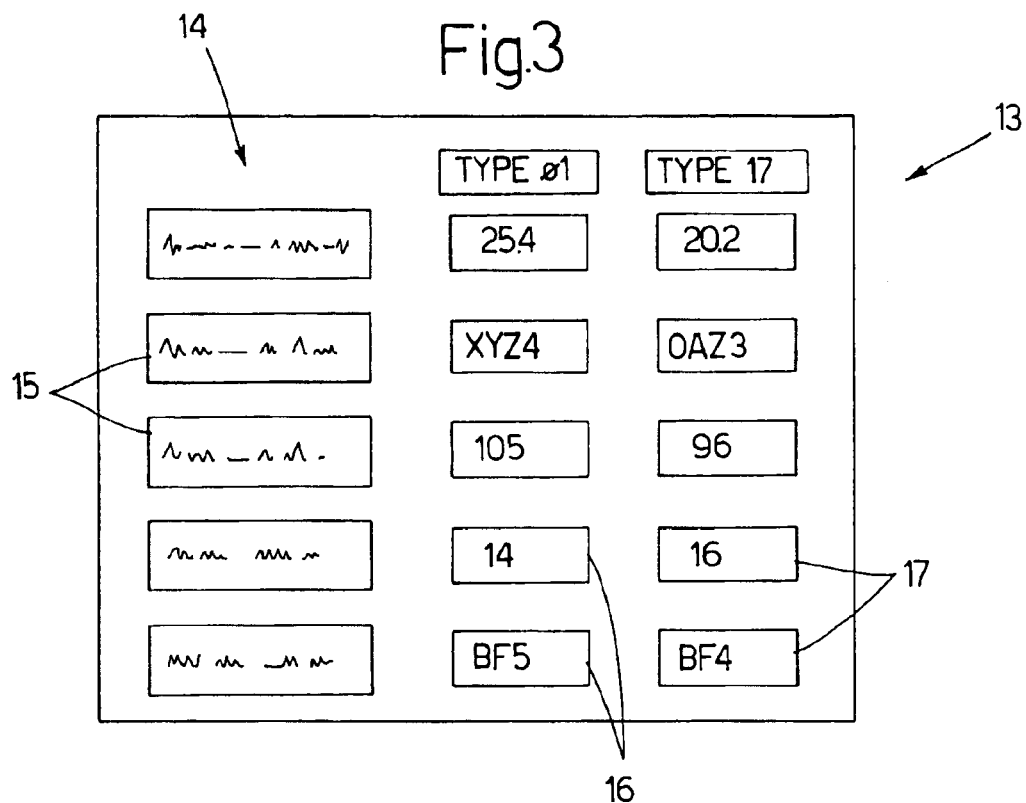
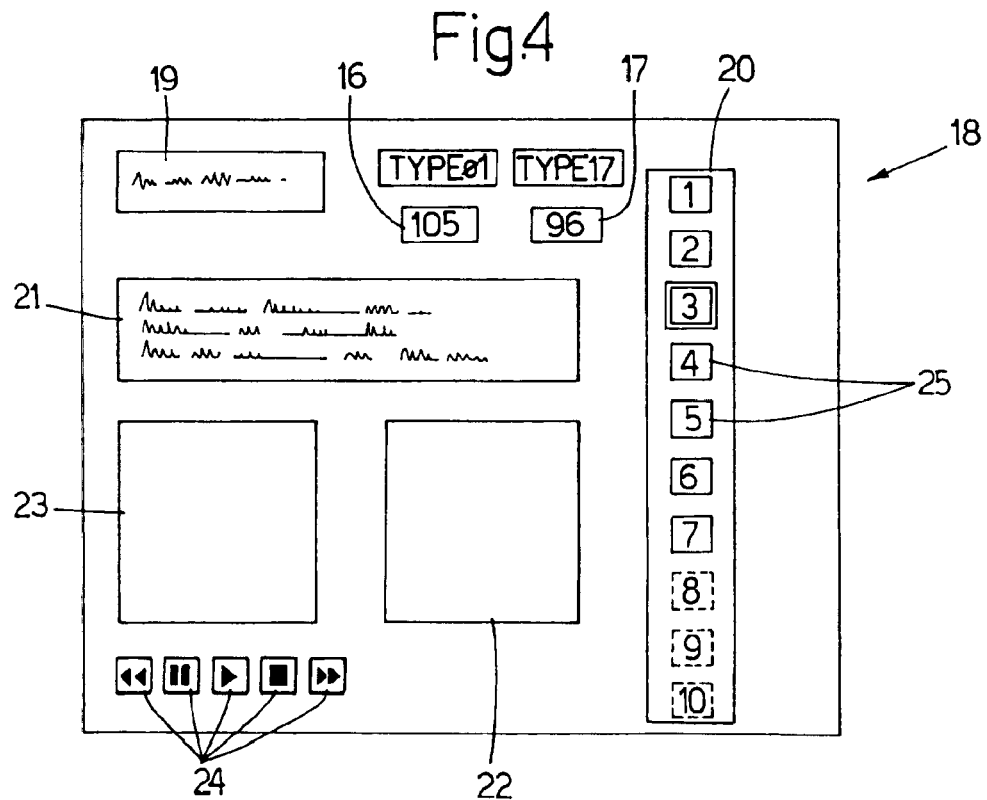

METHOD AND UNIT FOR CHANGING THE CONFIGURATION OF AN AUTOMATIC MACHINE

The present invention relates to a method of changing the configuration of an automatic machine.

The present invention may be used to particular advantage on automatic cigarette packing machines, to which the following description refers purely by way of example.

BACKGROUND OF THE INVENTION

The work configuration of known cigarette packing machines is increasingly subject to change to adapt production to current market requirements.

Work configuration changes normally comprise brand changes, in which the size of the finished packet remains the same and changes are made to the type of packing material or the location of any labels; and format changes, in which the size of the finished packet is also changed.

Both brand and format changes normally call for operator intervention on the packing machine, to calibrate or change mechanical parts and make electrical adjustments to the machine.

When making brand or format changes, the skill and experience of the operator are decisive in determining finished packet quality and smooth start-up of the machine. So, to ensure a high degree of efficiency of the machine, the operator must be trained regularly, at considerable cost to the firm.

Moreover, notwithstanding the skill of the operator, both brand and format changes are relatively painstaking jobs, in view of the potential damage involved in the event of errors or omissions on the part of the operator.

SUMMARY OF THE INVENTION

It is an object of the present invention to provide a method of changing the configuration of an automatic machine, designed to eliminate the aforementioned drawbacks, and which at the same time is cheap and easy to implement.

According to the present invention, there is provided a method of changing the configuration of an automatic machine comprising a display device and a selection device; a user selecting a desired end configuration by means of the selection device; and the method being characterized by displaying, by means of the display device, an orderly list of the operations to be performed on the automatic machine to convert the automatic machine from a current start configuration to said desired end configuration.

The present invention also relates to a unit for changing the configuration of an automatic machine.

According to the present invention, there is provided a unit for changing the configuration of an automatic machine; the unit comprising selection means whereby a user selects a desired end configuration; and the unit being characterized by comprising display means for displaying an orderly list of the operations to be performed on the machine to convert the machine from a current start configuration to the desired end configuration.

BRIEF DESCRIPTION OF THE DRAWINGS

A non-limiting embodiment of the present invention will be described by way of example with reference to the accompanying drawings, in which:

FIG. 1 shows a schematic front view of a cigarette packing machine featuring the unit according to the present invention;

FIGS. 2, 3 and 4 show, schematically, the displays shown at successive operating instants by a display device of the FIG. 1 unit.

DETAILED DESCRIPTION OF THE INVENTION

Number 1 in FIG. 1 indicates as a whole an automatic packing machine for producing packets 2 of cigarettes. Packing machine 1 is substantially known and, for example, of the type known commercially as "X500" and produced by G.D. S.p.A.

Packing machine 1 is equipped with a control unit 3 housed in a cabinet 4 located close to and connected to packing machine 1 over cables (not shown).

Control unit 3 also performs the functions of a user-interface or so-called "HMI" device, and therefore integrates a known industrial computer having a data display screen 5 and a keying device 6, which is normally defined by a keyboard and/or pointing device. Alternatively, keying device 6 may be integrated in screen 5 in the form of a so-called "touch-screen".

Packing machine 1 comprises a number of known operating devices (not shown individually), which are controlled by control unit 3, and each of which performs a given function.

Packing machine 1 is designed to produce various types of packets 2 of cigarettes, which differ according to the type of packing material used (in particular, the graphics printed on the packing material) and/or in size. To produce each type of packet 2, packing machine 1 must be set to a respective work configuration c corresponding to a given configuration of the aforementioned operating devices, and to a corresponding configuration of the operating parameters of control unit 3.

To change the type of packet 2 produced on packing machine 1, the work configuration C of packing machine 1 must therefore be changed from a current start configuration C1 to a desired end configuration C2.

As regards control unit 3, changing work configuration C involves, as is known, memorizing new control unit 3 operating parameters relative to the new desired end configuration C2.

As regards the operating devices of automatic machine 1, on the other hand, changing work configuration C calls for performing certain technical operations—mechanical or electrical, calibrations, adjustments or replacements—on at least some of the operating devices of packing machine 1; each of which technical operations involves performing a sequence of given elementary operations.

Each operating device on packing machine 1 can, in fact, operate in various modes, each of which is assigned and identified by a respective operating value VF, so that each work configuration C of packing machine 1 corresponds to a given set of operating device operating values VF.

For example, an operating value VF may indicate the identification code of a part to be changed, or the state of a setting to be changed when changing work configuration C.

Changing work configuration C of packing machine 1 therefore involves performing certain technical operations on some of the operating devices to change some of the respective operating values VF from respective start states typical of current start configuration C1, to respective end states typical of the desired end configuration C2.

In a known memory (not shown) of control unit 3 is stored a database DBC of the work configurations of packing machine 1, in which each work configuration C is assigned a respective name (e.g. "Type01", "Type02", "Type03" . . . ), a description string, an image of the packet 2 corresponding to the work configuration, and a list of the respective operating value VF states corresponding to the work configuration C.

The same known memory (not shown) of control unit 3 also stores an operation database DBI, which assigns each operating value VF a corresponding technical operation to be performed by the operator on packing machine 1 to change the operating value VF.

Each technical operation is assigned a respective name (e.g. "Outer guide height", "Inner guide height" . . . ), possibly a text string describing the technical operation, and a set of help procedures, each corresponding to an elementary operation defining the technical operation itself. Each help procedure comprises a text string and a photo and/or video showing how the elementary operation is to be performed.

In actual use, to change work configuration C, the operator selects, in known manner using keying device 6, an "assisted configuration change" procedure mainly designed for unskilled operators, or a "standard configuration change" procedure mainly designed for skilled operators.

When the "assisted configuration change", procedure is selected, screen 5 shows a configuration C selection display 7 as shown in FIG. 2, and which shows the name 8 of the current configuration C1 ("Type01" string in FIG. 2), and a name 9 of a desired configuration C2 ("Type17" string in FIG. 2) which can be selected by the operator from a list 10 of work configurations C contained in database DBC. For both the current and desired configurations C1 and C2, the configuration C selection display 7 shows a respective description string 11 and a respective image 12 of the packet 2 corresponding to the work configuration C1, C2.

When the desired work configuration C2 is selected by the operator, screen 5 shows a summary display 13 as shown in FIG. 3, and which shows an orderly list 14 of all and only the technical operations to be performed on automatic machine 1 to convert automatic machine 1 from the current start configuration C1 to the desired end configuration C2. More specifically, list 14 is arranged according to the sequence in which the technical operations are to be performed.

Each technical operation in list 14 is accompanied by a name string 15 of the technical operation itself, the state 16 of at least one respective operating value VF in the start configuration C1 ("Type01"), and the state 17 of the same operating value VF in the end configuration C2 ("Type17").

Control unit 3 compiles list 14 from configuration database DBC, and enters into list 14 all and only the operating values VF having different states in the current start configuration C1 and the desired end configuration C2. Control unit 3 also uses operation database DBI, which assigns each operating value VF the corresponding technical operation to be performed by the operator on packing machine 1 to change the operating value VF.

Each technical operation in list 14 can be selected individually in known manner to obtain a detail display 18 as shown in FIG. 4, and which shows, for the selected technical operation, a name string 19 and an orderly list 20 of elementary operations to be performed to carry out the technical operation. The technical operation in detail display 18 may also be accompanied by a text description.

When an elementary operation is selected by the operator in known manner from list 20 (e.g. elementary operation "3" in the FIG. 4 detail display 18), the display shows a respective text description 21, a respective photographic image in a window 22, and a respective video film, preferably with sound, in a window 23. The video film can be controlled in known manner by means of push-buttons 24 associated with window 23.

List 20 comprises a number of push-buttons 25 (numbered 1 to 10), only some of which (numbered 1 to 7) are selectable by actually corresponding to respective elementary operations, while the others (numbered 8 to 10) are not selectable by not corresponding to respective elementary operations.

By way of an alternative to the above operating mode, when the "assisted configuration change" procedure is selected and the operator selects the desired work configuration C2 on the FIG. 2 selection display 7, screen 5, as opposed to showing the FIG. 3 summary display 13, goes straight to the detail display 18 of the first technical operation in list 14.

Starting with the detail display 18 of the first technical operation, the operator is shown successively and in known manner the detail displays 18 of all the technical operations in list 14. More specifically, before going on to the next technical operation display, the operator must first confirm performance of each technical operation in list 14.

The operator is therefore guided through the sequence of technical operations and at the same time instructed in how to perform each elementary operation, thus ensuring all the technical operations required to change the selected work configuration C are performed by the operator in the correct sequence and with no omissions. Moreover, since each technical operation is also assigned an operating value VF, each adjustment or replacement is based on objective data to be conformed with, as opposed to depending on the skill of the operator.

At the end of the "assisted configuration change" procedure, regardless of whether or not the FIG. 3 summary display 13 is shown, the operator informs control unit 3 in known manner that all the technical operations in list 14 have been completed, and the configuration change procedure is terminated by loading the new operating parameters of control unit 3 relative to the desired end configuration C2 into the memory of control unit 3.

The "standard configuration change" procedure differs from the "assisted configuration change" procedure by not displaying the technical operations to be performed to change work configuration C upon the operator selecting desired work configuration C2. The configuration change procedure, in fact, is terminated immediately by loading the new operating parameters of control unit 3 relative to the desired end configuration C2 into the memory of control unit 3.

The operators of automatic machine 1 are normally authorized to use the "assisted configuration change" and "standard configuration change" procedures, but not to change the content of configuration database DBC, operation database DBI, and any other information displayed during the "assisted configuration change" procedure.

Such changes can only be made by specific technical personnel, normally plant maintenance technicians, with the necessary skill and experience to ensure any changes are made correctly.

More specifically, whereas routine operators of automatic machine 1 are allowed read-only access to displays 7, 13 and 18, maintenance technicians of automatic machine 1, by entering one or more passwords, are allowed both read and change access to displays 7', 13' and 18', similar to respective displays 7, 13 and 18, to update all the data displayed on screen 5.

In actual use, to change the state 16 of an operating value VF or a technical operation help procedure, the operator having an update permission is given access to a selection display 7', in which, besides selecting current start configuration C1 and desired end configuration C2, it is also possible to change description string 11 and image 12 of configuration C2.

Screen 5 then shows a summary display 13' containing an orderly list 14' of all the technical operations to be performed on automatic machine 1, together with the respective operating values VF.

The operator, on selecting a technical operation from list 14' in known manner, is given access to detail display 18', in which all the data displayed on screen 5 can be changed.

More specifically, changes can be made to state 17 of operating value VF of end configuration C2, to technical operation name string 19, and to the data of each elementary operation associated with the technical operation. Each push-button 25 in list 20 can be activated to assign a respective elementary operation to that particular push-button 25, or can be deactivated to cancel the previously set association. Changes can also be made to the text description 21 of each elementary operation, and images and video films can be loaded from any bulk memory connected locally or remotely to control unit 3.

Unlike the unskilled-operator display 13, which only shows the technical operations whose operating values VF have different states in current start configuration C1 and desired end configuration C2, display 13' for skilled operators with update-mode access shows a list 14' of all the technical operations to be performed on automatic machine 1, regardless of the respective operating values VF.

In a further embodiment, control unit 3 has a network connection—typically operating to the Ethernet standard—by which a known user interface device (not shown) can interact with control unit 3.

In this case, the user interface device comprises configuration database DBC, operation database DBI and the interface control logic to display "assisted configuration change" and/or "standard configuration change" procedures. At the end of the "configuration change" procedure, the user interface communicates with control unit 3 in known manner to load the new control unit 3 operating parameters relative to the desired end configuration.

What is claimed is:

1. A method of producing various types of articles using a same automatic machine comprising a number of operating devices controlled by a control unit; the operating devices can operate in various modes, each of which is assigned and identified by a respective operating value; the method comprising the following steps:

creating a configuration database, in which each work configuration is assigned a name, a description string, an image of the article corresponding to the work configuration, and a list of the respective operating value states corresponding to the work configuration, creating an operation database, which assigns each operating value a corresponding technical operation to be performed by the operator on the automatic machine to change the operating value;

running the automatic machine set in a first configuration for producing a first type of articles;

setting the automatic machine from the first configuration to a second configuration; and running the automatic machine set in the second configuration for producing a second type of articles;

wherein the step of setting the automatic machine from the first configuration to the second configuration comprises the further step of:

selecting the desired second configuration by means of a selection device;

creating an orderly list of all and only the technical operations to be performed on the automatic machine to convert the automatic machine from the current first configuration to the desired second configuration by using the configuration database for entering into the list the operating values having different states in the current first configuration and the desired second configuration and by using the operation database for assigning each changed operating value the corresponding technical operation to be performed by the operator to change the operating value; and displaying, by means of a display device, the orderly list of all and only the technical operations to be performed on the automatic machine to convert the automatic machine from the current first configuration to said desired second configuration.

2. A method as claimed in claim 1, wherein said operations has to be performed according to a given sequence; the operation in said list are listed according to said sequence.

3. A method as claimed in claim 1, and comprising the further step of displaying, together with at least one said operation, the value of at least one respective operating parameter in the first configuration, and the value of the same operating parameter in the second configuration.

4. A method as claimed in claim 3, wherein said operating parameter is a numeric parameter of an operating member of the automatic machine.

5. A method as claimed in claim 3, wherein said operating parameter is an identification code of a part of automatic machine.

6. A method as claimed in claim 1, wherein, in association with at least one said operation, a description is displayed of the operations to be performed to carry out said operation.

7. A method as claimed in claim 6, wherein said description comprises an orderly sequence of elementary operations to be performed to carry out the relative operation.

8. A method as claimed in claim 7, wherein a respective text description is displayed for at least one said elementary operation.

9. A method as claimed in claim 7, wherein a respective photographic image is displayed for at least one said elementary operation.

10. A method as claimed in claim 7, wherein a respective video film is displayed for each said elementary operation.

11. A method as claimed in claim 10, wherein said video film is complete with sound.

12. A method as claimed in claim 1, wherein, when said operations shown in said list have all been performed, new operating parameters of the control unit relative to the desired second configuration are transferred to the control unit.

13. A method as claimed in claim 12, wherein, to transfer the new operating parameters, an operator must first have confirmed performance of each operation in said list.

14. A method as claimed in claim 1, wherein starting with the detail display of the first technical operation, the operator is shown successively the detail displays of all the technical operations in list; before going on to the next technical operation display, the operator must first confirm performance of each technical operation in list.

* * * * *